(12) United States Patent
Fox

(10) Patent No.: US 8,574,701 B2
(45) Date of Patent: Nov. 5, 2013

(54) PROTECTIVE BUMPER DEVICE

(76) Inventor: Kim Louise Fox, Phoenix, AZ (US)

( * ) Notice: Subject to any disclaimer, the term of this patent is extended or adjusted under 35 U.S.C. 154(b) by 185 days.

(21) Appl. No.: 13/327,741

(22) Filed: Dec. 15, 2011

(65) Prior Publication Data

US 2013/0156998 A1    Jun. 20, 2013

(51) Int. Cl.
*E04G 21/24* (2006.01)

(52) U.S. Cl.
USPC .............................. 428/99; 428/188; 52/835

(58) Field of Classification Search
USPC .................. 428/99, 188; 52/835; 248/345.1
See application file for complete search history.

(56) References Cited

U.S. PATENT DOCUMENTS 6,389,777 B1 * 5/2002 Karlsson ..................... 52/741.3

* cited by examiner

*Primary Examiner* — Alexander Thomas
(74) *Attorney, Agent, or Firm* — Parsons & Goltry; Robert A. Parsons; Michael W. Goltry

(57) ABSTRACT

A protective bumper device for attachment to an upright member, the device including a flexible base having a first surface for receipt against an upright member and an opposing second surface carries at least one elongated bumper member having a first end and a second end. An aperture extends through the elongated bumper member from the first end to the second end. A strap member extends through the aperture a first end and a second end extending beyond the ends of the elongated bumper member. A fastening mechanism including an engagement element and a complemental engagement element is attached to the ends of the strap member for releasable engagement.

17 Claims, 3 Drawing Sheets

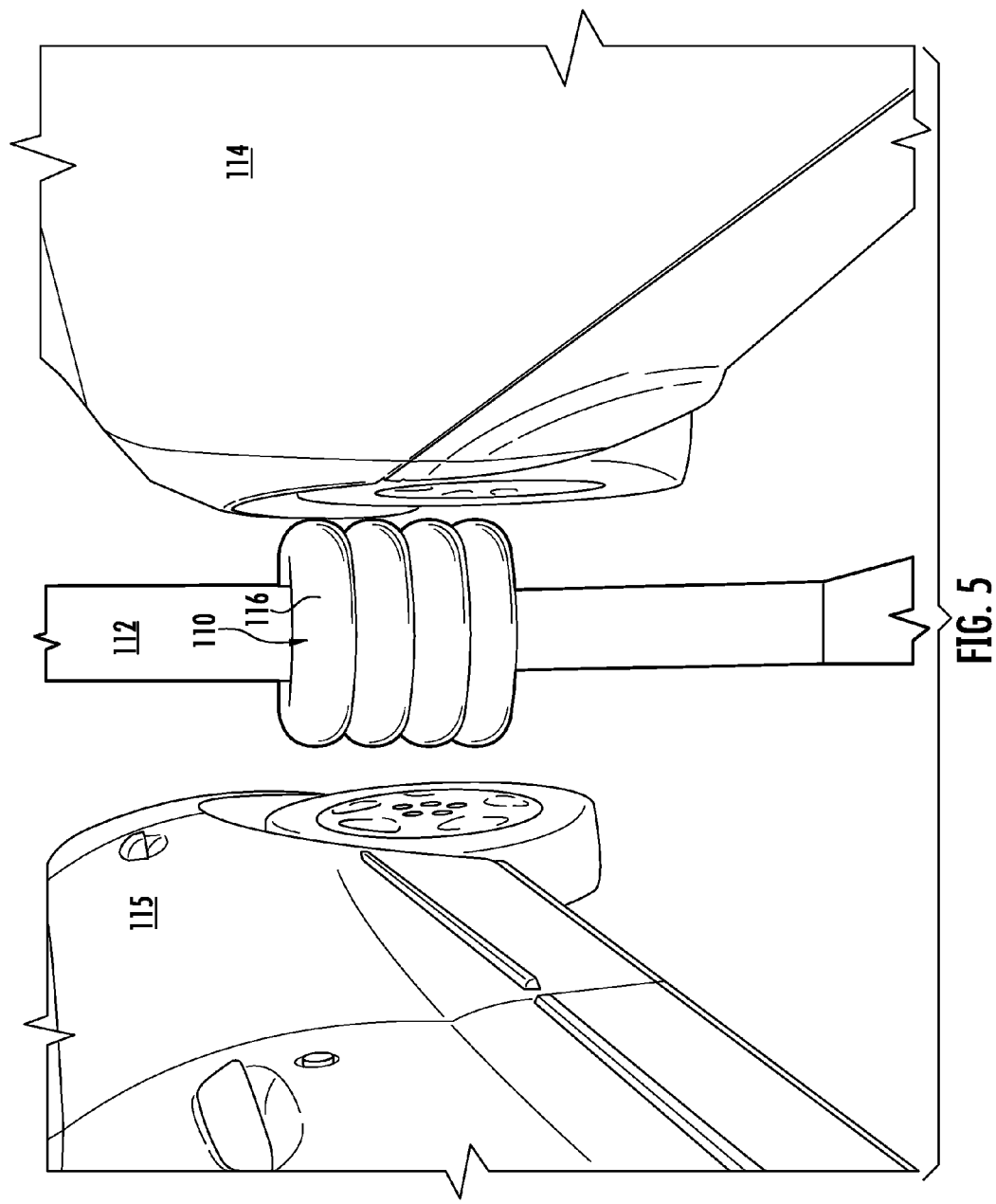

PROTECTIVE BUMPER DEVICE

FIELD OF THE INVENTION

This invention relates to protective padding devices.

More particularly, the present invention relates to devices for protecting vehicles from rigid upright structures, such as parking garage pillars, posts, etc.

BACKGROUND OF THE INVENTION

In the field of protective padding devices, the protection of vehicles which may contact and be damaged by hard, rigid structures has long been a desirable objective. To this end, various types of padding structures have been developed. More particularly, vehicles are often damaged by contact with posts, poles, pillars and other upright structures. The damage typically occurs when opening doors to enter or exit the vehicle, backing out of or driving in to a narrow parking space with surrounding vertical posts or pillars. Attempts at preventing damage include hanging or affixing padding to the side of the vehicle, or attaching padded mats to the upright structure. Positioning the padding on the vehicle is unsatisfactory because the padding itself may scratch, mar or otherwise damage the vehicle, and the device is generally attached after driving, but prior to exiting the vehicle. This is, at a minimum, awkward. If the device is attached during driving, it can adversely impact the functioning of the vehicle. Padding the upright member can be much more effective, and is generally accomplished by attaching sheets of padding to the upright using adhesives, or, in a much more complicated operation, an overlying wrap of thin covering material. While effective for the desired function, these devices are often permanently attached and/or difficult to install and remove, and generally must be fitted to the dimensions of a specific upright member. Additionally, these structures are not securable to the upright member and are therefore subject to being stolen or removed without authorization.

It would be highly advantageous, therefore, to remedy the foregoing and other deficiencies inherent in the prior art.

An object of the present invention is to provide a protective bumper for upright members, such as parking garage posts and pillars.

Another object of the present invention is to provide an easily secured and removable protective bumper.

Yet another object of the present invention is to provide a protective bumper which can be securely locked in position to prevent slippage and unauthorized removal.

A further object of the present invention is to provide a protective bumper which can be adjusted to accommodate different shapes and sizes of upright members.

SUMMARY OF THE INVENTION

Briefly, to achieve the desired objects and advantages of the instant invention provided is a protective bumper device including a flexible base having a first surface for receipt against an upright member and an opposing second surface. An elongated bumper member having a first end and a second end is carried by the flexible base and extends from the opposing second surface. An aperture is defined by the elongated bumper member and extends therethrough from the first end to the second end. A strap member extends through the aperture and has a first end extending beyond the first end of the elongated bumper member and a second end extending beyond the second end of the elongated bumper member. A fastening mechanism is also provided and includes an engagement element coupled to the first end of the strap member and a complemental engagement element attached to the second end of the strap member for releasable engagement with the engagement element.

In another aspect, provided is a second elongated bumper member having a first end and a second end, the second elongated bumper member carried by the flexible base and extending from the opposing second surface parallel to the elongated bumper member. A second aperture is defined by the second elongated bumper member and extends therethrough from the first end to the second end. A second strap member extends through the second aperture and has a first end extending beyond the first end of the second elongated bumper member and a second end extending beyond the second end of the second elongated bumper member. A second fastening mechanism including an engagement element coupled to the first end of the second strap member and a complemental engagement element attached to the second end of the second strap member for releasable engagement with the engagement element.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 5 is another embodiment of a bumper device installed on an upright member.

DETAILED DESCRIPTION OF THE PREFERRED EMBODIMENTS

Figure 1:
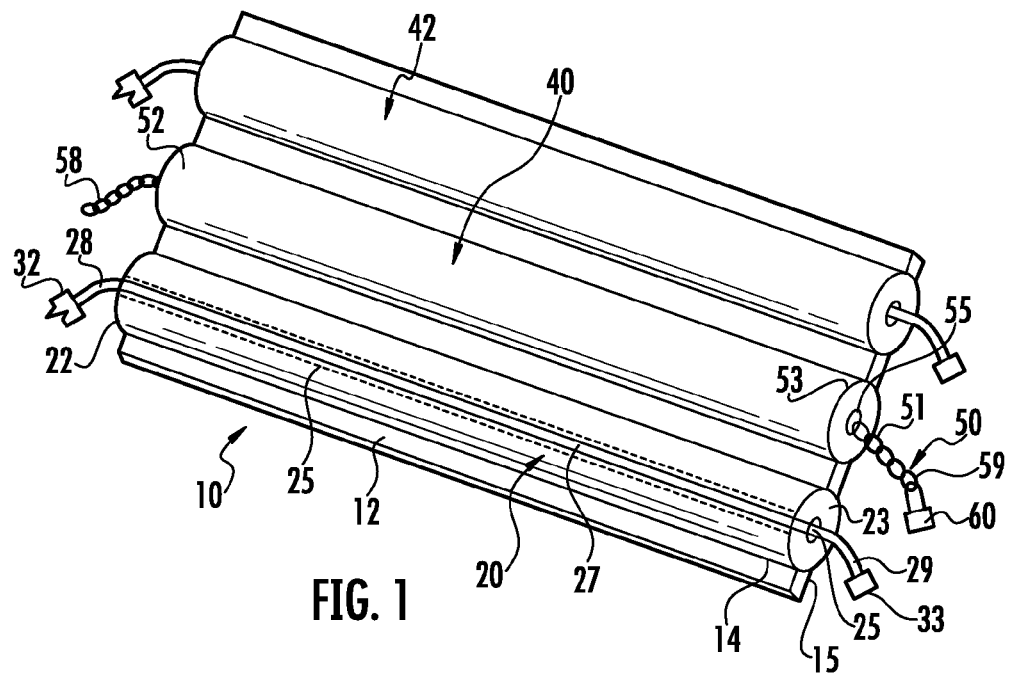
FIG. 1 is a perspective view of a protective bumper device according to the present invention.
Figure 2:
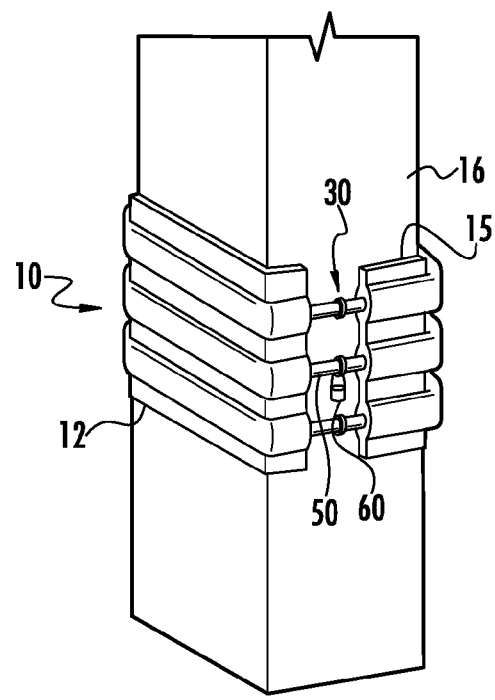
FIG. 2 is a perspective view of the protective bumper installed on an upright member.

Turning now to the drawings in which like reference characters indicate corresponding elements throughout the several views, attention is first directed to FIGS. 1 and 2 which illustrate a protective bumper device generally designated 10. Bumper device 10 includes a flexible base 12 having an top surface 14 and an opposing bottom surface 15. Referring specifically to FIG. 2, base 12 is formed of a flexible material permitting it to be bent and wrapped about an upright member 16. Base 12 can be formed of substantially any flexible material such as foam, plastic, rubber, cloth material, and the like, so as to support and position one or more bumper members, as will be described presently. Base 12 is positioned, when in use, such that bottom surface 15 is in contact with upright member 16.

An elongated bumper member 20 is carried by base 12 and extends from top surface 14 thereof and is formed of cushioning material such as foam, rubber, or the like. Bumper member 20 includes opposing ends 22 and 23. Bumper member 20 extends across base 12 with ends 22 and 23 terminating proximate opposing sides of base 12. An aperture 25 is defined by elongated bumper member 20 and extends therethrough from end 22 to end 23. A strap member 27 extends through aperture 25 and includes an end 28 extending beyond end 22 of elongated bumper member 20 and an end 29 extending beyond end 23 of elongated bumper member 20. It will be understood that the term "strap member" includes substantially any flexible material capable of being passed through aperture 25, including but not limited to rope, webbing, chain, cable, strips of cloth or leather, woven material and the like. A fastening mechanism 30 is provided to securely engage ends 28 and 29. Fastening mechanism 30 includes an engagement element 32 coupled to end 28 of strap member 27 and a complemental engagement element 33 attached to end 29 of strap member 27 for releasable engagement with the engagement element. It should be understood that fastening mechanism 30 can include many types of fastening members such as buckles, snap fitting and the like, or, as preferred quick release fasteners.

Figure 3:
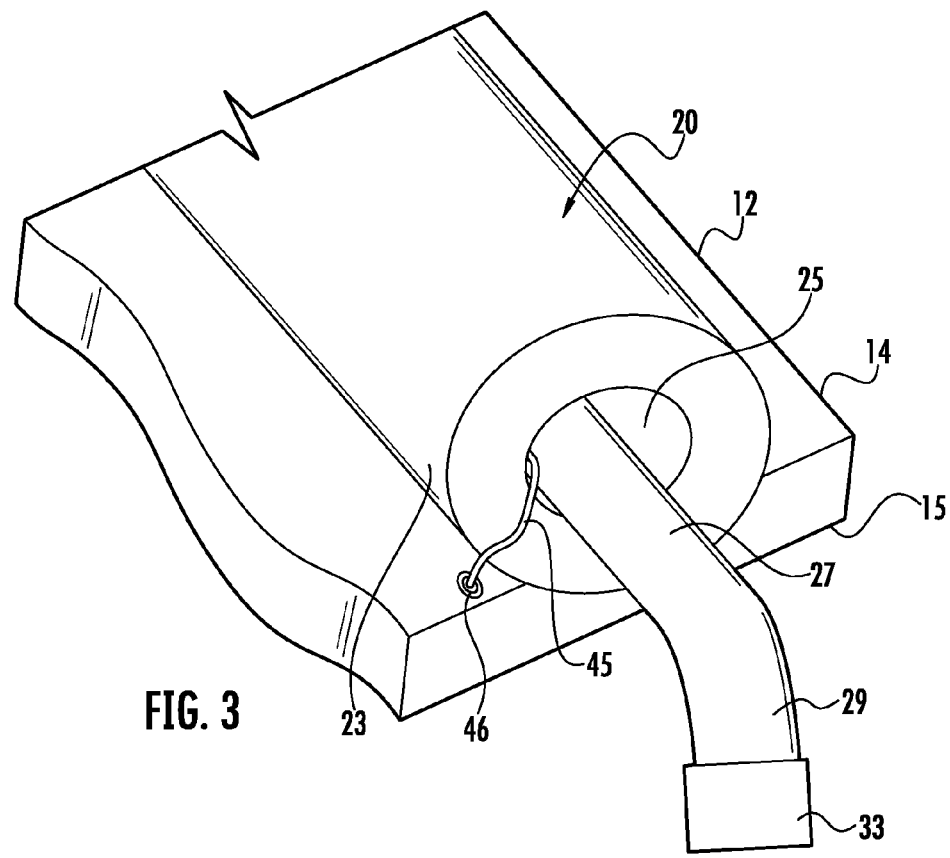
FIG. 3 is an enlarged perspective view illustrating a fastener fastening the bumper member to the base.

Still referring to FIG. 1, bumper device 10 can include additional elongated bumper members 40 and 42. While it will be understood that one or more elongated bumper members can be employed, three is a preferred number. Bumpers members 20, 40 and 42 are carried by base 12 and positioned so as to be parallel and spaced apart. Base 12 acts to support and maintain the position of bumper members 20, 40 and 42 when installed on an upright member. Bumper member 20, 40 and 42 are carried by base 12 and can be coupled thereto by using an adhesive, heat welding, stitching and the like, or attached by a cord 45 passing through aperture 25 and grommets 46 positioned in base 12 adjacent ends 22 and 23 (FIG. 3).

In use, bumper device 10 is positioned with bottom surface 15 of base 12 against upright member 16 and wrapped therearound. Bumper device 10 is oriented so as to position bumper members 20, 40 and 42 substantially horizontally and bent with base 12 to approximate the shape of upright member 16. Bumper device 10 is fastened in place by engaging engagement element 32 and complemental engagement element 33 of strap member 27. Adjustable buckles can be used for engagement mechanism 30 so that bumper device can be tightened around upright member 16 as desired. It will be understood that the shape of upright member can be substantially any shape such as round, square, oval, and the like. The only limiting factor as to whether bumper device 10 can be installed is the diameter of the upright member and the length of flexible strap 27. Bumper device 10 can be positioned at substantially any height to achieve maximum protection, and can be adjusted for different height vehicles. As can be seen in FIG. 2, protective device 10 substantially encircles upright member 16 in this embodiment. However, it will be understood that bumper device 10 can be made shorter or longer to fully wrap or partially wrap substantially any size upright member. For any given size bumper device, substantially any diameter upright member can be accommodated by providing longer, shorter or adjustable straps 27. In this instance, larger diameter upright members will not be fully encircled by the bumper members, but the bumper members can be positioned where desired. For full coverage of a larger diameter upright member, a longer base 12 and bumper members 20, 40 and 42 would be required. Furthermore, a bumper device can be provided that presents bumper members on only one or on more sides of an upright member.

To prevent unauthorized removal of bumper device 10, a securing mechanism 50 can be provided. In this preferred embodiment, securing mechanism 50 includes a security strap 51, which can be a chain, cable or other difficult to cut strap associated with central bumper member 40. Bumper member 40 includes opposing ends 52 and 53. Bumper member 40 extends across base 12 with ends 52 and 53 terminating proximate opposing sides of base 12. An aperture 55 is defined by elongated bumper member 40 and extends therethrough from end 52 to end 53. Security strap 51 extends through aperture 55 and includes an end 58 extending beyond end 52 of elongated bumper member 40 and an end 59 extending beyond end 53 of elongated bumper member 40. Ends 58 and 59 can be secured by a locking device 60. Thus, only an individual capable of removing the locking device can remove bumper device 10. While securing mechanism 50 is described as being associated with middle bumper member 40, it will be understood that it could be used with any of the bumper members, even those having straps 27 therethrough. Typically, securing mechanism 50 need only be used with a single bumper member of any one bumper device 10.

Figure 4:
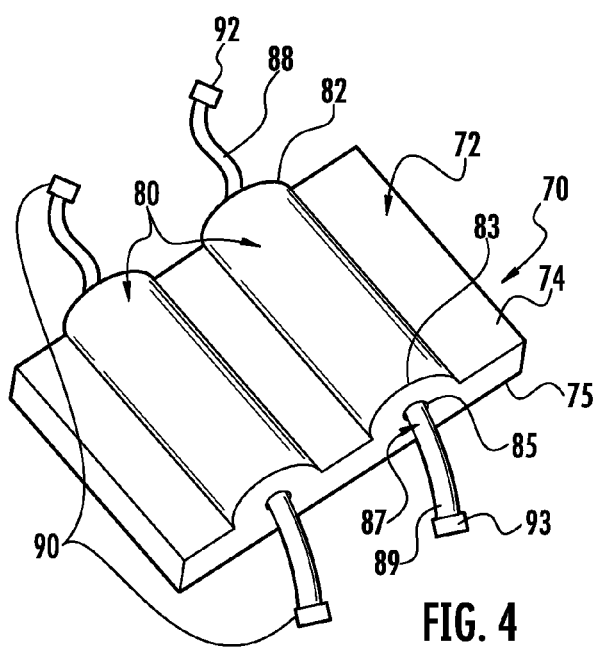
FIG. 4, is an enlarged partial view illustrating another embodiment of the base and bumper assembly.

While bumper device 10 has been described as including at least one bumper member 20 carried by an upper surface 14 thereof, it will be understood that instead of attaching bumper 20 to base 12 using adhesives, heat welding, stitching or the like, it can be attached during formation by forming a base and bumper member as a single, one-piece structure. This is illustrated in FIG. 4 with a bumper device generally designated 70. Device 70 operates in the same manner as device 10, and therefore the operation will not be described in detail. Bumper device 70 includes a flexible base 72 having a top surface 74 and an opposing bottom surface 75. Two elongated bumper members 80 are carried by base 72 and each extends from top surface 74 thereof. While two are described, one, three, or more can be employed. Bumper members 80 include opposing ends 82 and 83 and extend across base 72 with ends 82 and 83 terminating proximate opposing sides of base 72. An aperture 85 is defined by each elongated bumper member 80 and extends therethrough from end 82 to end 83. In this specific embodiment, base 72 and bumper members 80 are formed in a single one piece structure such as by molding using foam, rubber, or other cushioning material. A strap member 87 extends through each aperture 85 and includes an end 88 extending beyond end 82 of elongated bumper member 80 and an end 89 extending beyond end 83 of elongated bumper member 80. It will be understood that the term "strap member" includes substantially any flexible material capable of being passed through aperture 85, including but not limited to rope, webbing, chain, cable, strips of cloth or leather, woven material and the like. A fastening mechanism 90 is provided to securely engage ends 88 and 89. Fastening mechanism 90 includes an engagement element 92 coupled to end 88 of strap member 87 and a complemental engagement element 93 attached to end 89 of strap member 87 for releasable engagement with the engagement element. It should be understood that fastening mechanism 90 can include many types of fastening members such as buckles, snap fitting and the like, or, as preferred quick release fasteners.

Referring now to FIG. 5, a bumper device generally designated 110 is illustrated. Device 110 is shown installed on an upright member 112 between two parked vehicles 114 and 115. Device 110 includes four bumper members 116 fully encircling upright structure 112, thereby protecting both vehicles 114 and 115, and is intended to illustrate that multiple bumper members 116 can be employed. Additionally, in previous embodiments, bumper members have been spaced apart. This is not necessarily the case, device 110 includes bumper members 116 positioned parallel but adjacent one another. In any of the embodiments, the spacing or lack thereof between bumper members is maintained by the base which carries them.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A protective bumper device comprising:
   a flexible base having a first surface for receipt against an upright member and an opposing second surface;
   an elongated bumper member having a first end and a second end, the elongated bumper member carried by the flexible base and extending from the opposing second surface;
   an aperture defined by the elongated bumper member and extending therethrough from the first end to the second end;
   a strap member extending through the aperture and having a first end extending beyond the first end of the elongated bumper member and a second end extending beyond the second end of the elongated bumper member; and
   a fastening mechanism including an engagement element coupled to the first end of the strap member and a complimental engagement element attached to the second end of the strap member for releasable engagement with the engagement element.

2. A protective bumper device as claimed in claim 1 wherein the elongated bumper member and base are formed of a single integral piece.

3. A protective bumper device as claimed in claim 1 further including a fastener fastening the elongated bumper member to the base.

4. A protective bumper device as claimed in claim 1 further including:
   a second elongated bumper member having a first end and a second end, the second elongated bumper member carried by the flexible base and extending from the opposing second surface parallel to the elongated bumper member;
   a second aperture defined by the second elongated bumper member and extending therethrough from the first end to the second end;
   a second strap member extending through the second aperture and having a first end extending beyond the first end of the second elongated bumper member and a second end extending beyond the second end of the second elongated bumper member; and
   a second fastening mechanism including an engagement element coupled to the first end of the second strap member and a complemental engagement element attached to the second end of the second strap member for releasable engagement with the engagement element.

5. A protective bumper device as claimed in claim 1 further including:
   a security strap extending through the aperture and having a first end extending beyond the first end of the elongated bumper member and a second end extending beyond the second end of the elongated bumper member; and
   a locking device coupling the first end and the second end of the security strap.

6. A protective bumper device as claimed in claim 4 wherein the elongated bumper member and the second elongated bumper member are carried by the base in a parallel spaced apart relationship.

7. A protective bumper device comprising:
   an upright member having contours;
   a flexible base having a first surface received against the upright member and an opposing second surface, the flexible base bent approximating the contours of the upright member;
   an elongated bumper member having a first end and a second end, the elongated bumper member carried by the flexible base and extending from the opposing second surface, the elongated bumper member bending with the base;
   an aperture defined by the elongated bumper member and extending therethrough from the first end to the second end;
   a strap member extending through the aperture and having a first end extending beyond the first end of the elongated bumper member and a second end extending beyond the second end of the elongated bumper member; and
   a fastening mechanism including an engagement element coupled to the first end of the strap member and a complemental engagement element attached to the second end of the strap member, the engagement element releasably engaging the complemental engagement element with the strap member encircling the upright member.

8. A protective bumper device as claimed in claim 7 wherein the elongated bumper member and base are formed of a single integral piece.

9. A protective bumper device as claimed in claim 7 further including a fastener fastening the elongated bumper member to the base.

10. A protective bumper device as claimed in claim 7 further including:
    a second elongated bumper member having a first end and a second end, the second elongated bumper member carried by the flexible base and extending from the opposing second surface parallel to the elongated bumper member;
    a second aperture defined by the second elongated bumper member and extending therethrough from the first end to the second end;
    a second strap member extending through the second aperture and having a first end extending beyond the first end of the second elongated bumper member and a second end extending beyond the second end of the second elongated bumper member; and
    a second fastening mechanism including an engagement element coupled to the first end of the second strap member and a complemental engagement element attached to the second end of the second strap member the strap member, the engagement element releasably engaging the complemental engagement element with the second strap member encircling the upright member.

11. A protective bumper device as claimed in claim 7 further including:
    a security strap extending through the aperture and having a first end extending beyond the first end of the elongated bumper member and a second end extending beyond the second end of the elongated bumper member; and
    a locking device coupling the first end and the second end of the security strap around the upright member.

12. A protective bumper device as claimed in claim 10 wherein the elongated bumper member and the second elongated bumper member are carried by the base in a parallel spaced apart relationship.

13. A protective bumper device comprising:
    a flexible base having a first surface for receipt against an upright member and an opposing second surface;

a first elongated bumper member having a first end and a second end, the first elongated bumper member carried by the flexible base and extending from the opposing second surface;

an aperture defined by the first elongated bumper member and extending therethrough from the first end to the second end;

a strap member extending through the aperture and having a first end extending beyond the first end of the first elongated bumper member and a second end extending beyond the second end of the first elongated bumper member;

a fastening mechanism including an engagement element coupled to the first end of the strap member and a complimental engagement element attached to the second end of the strap member for releasable engagement with the engagement element;

a second elongated bumper member having a first end and a second end, the second elongated bumper member carried by the flexible base and extending from the opposing second surface parallel to the first elongated bumper member;

a second aperture defined by the second elongated bumper member and extending therethrough from the first end to the second end;

a second strap member extending through the second aperture and having a first end extending beyond the first end of the second elongated bumper member and a second end extending beyond the second end of the second elongated bumper member; and a second fastening mechanism including an engagement element coupled to the first end of the second strap member and a complemental engagement element attached to the second end of the second strap member for releasable engagement with the engagement element.

14. A protective bumper device as claimed in claim 13 wherein the first elongated bumper member, the second elongated bumper member and the base are formed of a single integral piece.

15. A protective bumper device as claimed in claim 13 further including a first fastener fastening the first elongated bumper member to the base and a second fastener fastening the second elongated bumper member to the base.

16. A protective bumper device as claimed in claim 13 further including:

a security strap extending through one of the first the aperture and the second aperture and having a first end extending beyond the first end of one of the first elongated bumper member and the second elongated bumper member and a second end extending beyond the second end of one of the first elongated bumper member and the second elongated bumper member; and a locking device coupling the first end and the second end of the security strap.

17. A protective bumper device as claimed in claim 13 wherein the first elongated bumper member and the second elongated bumper member are carried by the base in a parallel spaced apart relationship.

* * * * *